(12) United States Patent
Leijnen (10) Patent No.: US 11,936,240 B2
(45) Date of Patent: Mar. 19, 2024

(54) STATOR FOR AN AXIAL FLUX MACHINE

(71) Applicant: MAGNAX BV, Kortrijk (BE)

(72) Inventor: Peter Leijnen, Bachte-Maria-Leerne (BE)

(73) Assignee: MAGNAX BV, Kortrijk (BE)

( * ) Notice: Subject to any disclaimer, the term of this patent is extended or adjusted under 35 U.S.C. 154(b) by 318 days.

(21) Appl. No.: 17/611,304

(22) PCT Filed: Apr. 16, 2020

(86) PCT No.: PCT/EP2020/060734
§ 371 (c)(1),
(2) Date: Nov. 15, 2021

(87) PCT Pub. No.: WO2020/239321
PCT Pub. Date: Dec. 3, 2020

(65) Prior Publication Data
US 2022/0302773 A1    Sep. 22, 2022

(30) Foreign Application Priority Data

May 27, 2019   (EP) ..................................... 19176802

(51) Int. Cl.
*H02K 1/14*     (2006.01)
*H02K 21/24*    (2006.01)

(52) U.S. Cl.
CPC ............. *H02K 1/148* (2013.01); *H02K 21/24* (2013.01)

(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS

| 4,574,713 A | * | 3/1986 | Kohnen ................... F27D 1/12 52/504 |
| 5,208,503 A | * | 5/1993 | Hisey .................... H02K 1/185 310/216.046 |

(Continued)

FOREIGN PATENT DOCUMENTS

| DE | 10048492 A1 | 4/2002 |
| WO | 2018015293 A1 | 1/2018 |

OTHER PUBLICATIONS

Extended European Search Report from corresponding European Application No. EP19176802.7, dated Oct. 23, 2019.
(Continued)

*Primary Examiner* — Maged M Almawri
(74) *Attorney, Agent, or Firm* — Workman Nydegger (57) ABSTRACT

A stator of the axial flux machine including an inner structure, an intermediate structure and an outer structure arranged coaxially around a central axis. The intermediate structure is arranged between the inner and the outer structure; and the inner structure includes a plurality of rotational symmetrical arranged stator elements a stator element having a ferromagnetic core and a coil wound around the ferromagnetic core; and the intermediate structure has a plurality of compression elements comprising a circular segment and a protrusion radially extending therefrom. The outer structure is configured to press the compression elements with the protrusions radially inward the inner structure against the stator elements, thereby compressing the coils and mechanically securing the stator elements.

11 Claims, 9 Drawing Sheets

(58) Field of Classification Search
CPC ............ H02K 1/146; H02K 1/16; H02K 1/18;
H02K 1/182; H02K 1/185; H02K 1/187;
H02K 1/06; H02K 15/022; H02K 5/207
USPC .............. 310/126, 49.29, 216.001, 216.009,
310/216.113, 216.125–216.129,
310/216.131–216.137, 216.021, 216.022,
310/216.024–216.029, 216.086, 216.099
See application file for complete search history.

(56) References Cited

U.S. PATENT DOCUMENTS

| | | | | |
|---|---|---|---|---|
| 5,252,875 A * | 10/1993 | Veronesi | ................... | H02K 7/14 310/90 |
| 5,786,651 A * | 7/1998 | Suzuki | ................. | H02K 15/022 310/216.009 |
| 5,859,486 A * | 1/1999 | Nakahara | ............... | H02K 1/148 310/216.084 |
| 5,870,894 A * | 2/1999 | Woollenweber | .... | F04D 25/0653 417/407 |
| 5,986,377 A * | 11/1999 | Yamada | ................. | H02K 15/06 310/216.013 |
| 6,044,737 A * | 4/2000 | Yao | ........................ | H02K 1/146 83/13 |
| 6,121,711 A * | 9/2000 | Nakahara | ............... | H02K 3/522 310/216.096 |
| 6,226,856 B1 * | 5/2001 | Kazama | ................. | H02K 15/02 29/609 |
| 6,449,950 B1 * | 9/2002 | Allen | ...................... | F02B 39/10 417/407 |
| 6,452,303 B1 * | 9/2002 | Marioni | ................. | H02K 1/148 310/254.1 |
| 6,504,284 B1 * | 1/2003 | Kazama | ................. | H02K 15/02 310/216.109 |
| 6,595,760 B2 * | 7/2003 | Shida | ..................... | H02K 1/148 310/194 |
| 7,084,545 B2 * | 8/2006 | Happel | ................... | H02K 1/148 310/216.074 |
| 7,199,492 B2 * | 4/2007 | Hashimoto | ............ | H02K 41/03 310/12.25 |
| 7,348,706 B2 * | 3/2008 | Ionel | ...................... | H02K 1/148 310/216.137 |
| 7,360,361 B2 * | 4/2008 | Prusinski | ................ | F01D 25/18 417/409 |
| 7,414,347 B2 * | 8/2008 | Wang | ..................... | H02K 3/522 310/260 |
| 7,777,387 B2 * | 8/2010 | Nagai | ................... | H02K 15/026 310/216.013 |
| 7,965,014 B2 * | 6/2011 | Shinagawa | ............ | H02K 1/148 310/216.113 |
| 7,986,064 B2 * | 7/2011 | Katagiri | ................. | H02K 1/148 310/43 |
| 8,157,543 B2 * | 4/2012 | Shimizu | ................... | F16C 3/02 417/407 |
| 8,400,043 B2 * | 3/2013 | Leiber | .................... | H02K 1/148 310/215 |
| 8,413,318 B2 * | 4/2013 | Ikeda | ................... | H02K 15/022 336/200 |
| 8,466,596 B2 * | 6/2013 | Maki | ..................... | H02K 1/148 310/216.043 |
| 8,487,502 B2 * | 7/2013 | Kaiser | ..................... | H02K 1/16 310/216.049 |
| 8,581,468 B2 * | 11/2013 | Kudose | .................... | H02K 1/16 310/216.049 |
| 8,689,427 B2 * | 4/2014 | Bourqui | .................. | H02K 1/148 310/216.074 |
| 8,882,478 B2 * | 11/2014 | Shimizu | ................. | F02B 39/10 417/406 |
| 8,941,274 B2 * | 1/2015 | Gianni | ................... | H02K 1/148 310/216.013 |
| 9,000,650 B2 * | 4/2015 | Bach Andersen | ..... | H02K 1/148 310/216.007 |
| 9,306,421 B2 * | 4/2016 | Lee | ........................ | B22F 5/106 |
| 9,531,222 B2 * | 12/2016 | Uchitani | .............. | H02K 15/105 |
| 9,634,533 B2 * | 4/2017 | Uchitani | ................ | H02K 3/522 |
| 9,780,616 B2 * | 10/2017 | Langford | ............... | H02K 3/522 |
| 10,128,700 B2 * | 11/2018 | Umeda | ................... | H02K 1/148 |
| 10,291,084 B2 * | 5/2019 | Utsumi | ................... | H02K 15/022 |
| 10,348,163 B2 * | 7/2019 | Lin | ........................ | H02K 1/148 |
| 10,673,289 B2 * | 6/2020 | Nakagawa | ............ | D06F 37/304 |
| 10,833,542 B2 * | 11/2020 | Ge | ........................ | H02K 1/148 |
| 11,165,312 B2 * | 11/2021 | Tokoi | ...................... | H02K 1/20 |
| 11,496,008 B2 * | 11/2022 | Georgiou | ................ | H02K 3/46 |
| 11,831,201 B2 * | 11/2023 | Yang | ...................... | H02K 1/148 |
| 2003/0057797 A1 * | 3/2003 | Kaneko | .................. | H02K 5/128 310/216.064 |
| 2003/0127933 A1 | 7/2003 | Enomoto et al. | | |
| 2003/0127937 A1 * | 7/2003 | Kanno | ..................... | H02K 1/24 310/261.1 |
| 2003/0127938 A1 * | 7/2003 | Shen | .................... | H02K 15/026 310/216.043 |
| 2003/0141780 A1 * | 7/2003 | Suzuki | ................... | H02K 3/522 310/216.101 |
| 2003/0141781 A1 * | 7/2003 | Suzuki | ................... | H02K 1/148 310/216.101 |
| 2003/0160533 A1 * | 8/2003 | Suzuki | ................... | H02K 1/148 310/216.074 |
| 2004/0061406 A1 * | 4/2004 | Yokota | ..................... | H02K 1/17 310/154.16 |
| 2004/0104638 A1 * | 6/2004 | Yoneda | .................. | H02K 1/148 310/216.012 |
| 2004/0124733 A1 * | 7/2004 | Yamamoto | .............. | B29C 70/72 29/596 |
| 2004/0164641 A1 * | 8/2004 | Yamada | ................... | H02K 3/524 310/194 |
| 2004/0189137 A1 * | 9/2004 | Hashimoto | ............ | H02K 29/03 310/402 |
| 2004/0256919 A1 * | 12/2004 | Hashimoto | ............ | H02K 41/03 310/12.25 |
| 2005/0017596 A1 * | 1/2005 | Naito | ..................... | H02K 1/148 310/156.32 |
| 2005/0067912 A1 * | 3/2005 | Murakami | ............. | H02K 1/148 310/216.043 |
| 2005/0073213 A1 * | 4/2005 | Naito | ..................... | H02K 1/148 310/156.32 |
| 2005/0099085 A1 * | 5/2005 | Du | ........................ | H02K 1/148 310/216.084 |
| 2005/0125988 A1 * | 6/2005 | Fukatsu | .................. | H02K 15/06 29/596 |
| 2005/0212378 A1 * | 9/2005 | Wang | ..................... | H02K 3/522 310/260 |
| 2006/0103263 A1 * | 5/2006 | Naito | ..................... | B60L 50/51 310/156.32 |
| 2007/0018528 A1 * | 1/2007 | Naitou | .................. | H02K 1/148 310/43 |
| 2007/0096587 A1 * | 5/2007 | Ionel | ...................... | H02K 1/148 310/180 |
| 2007/0114875 A1 * | 5/2007 | Lyle | ........................ | H02K 3/522 310/216.004 |
| 2007/0159014 A1 * | 7/2007 | Chen | ...................... | H02K 1/145 310/216.049 |
| 2007/0196615 A1 * | 8/2007 | Bach Andersen | ..... | H02K 1/148 428/57 |
| 2008/0106161 A1 * | 5/2008 | Matsuzaki | ............. | H02K 3/524 310/194 |
| 2008/0265694 A1 * | 10/2008 | Chuang | ................. | H02K 15/022 310/43 |
| 2009/0026851 A1 * | 1/2009 | Liou | ...................... | H02K 1/148 29/598 |
| 2009/0072647 A1 * | 3/2009 | Hino | ...................... | H02K 1/276 903/906 |
| 2009/0108699 A1 * | 4/2009 | Li | ........................ | H02K 1/148 310/216.009 |
| 2009/0127942 A1 * | 5/2009 | Rahman | ................. | H02K 3/493 310/44 |
| 2010/0001611 A1 * | 1/2010 | Utaka | ..................... | H02K 1/16 310/216.009 |
| 2010/0135830 A1 * | 6/2010 | Yasuda | ................... | H02K 1/146 310/216.069 |

(56) References Cited

U.S. PATENT DOCUMENTS

| | | | |
|---|---|---|---|
| 2010/0213785 A1* | 8/2010 | Nagai | H02K 1/148 310/216.043 |
| 2010/0225179 A1* | 9/2010 | Wang | H02K 41/031 310/12.26 |
| 2010/0247342 A1* | 9/2010 | Shimizu | F01D 25/12 417/410.1 |
| 2011/0037338 A1* | 2/2011 | Leiber | H02K 15/022 310/216.105 |
| 2011/0101816 A1* | 5/2011 | Kondou | H02K 1/16 310/216.069 |
| 2011/0115314 A1* | 5/2011 | Du | H02K 1/14 310/50 |
| 2011/0115317 A1* | 5/2011 | Stark | H02K 1/148 310/71 |
| 2011/0169368 A1* | 7/2011 | Tsumagari | H02K 1/12 310/216.009 |
| 2011/0210640 A1* | 9/2011 | Elser | H02K 3/522 310/208 |
| 2011/0221297 A1* | 9/2011 | Langford | H02K 15/024 310/215 |
| 2012/0169175 A1* | 7/2012 | Yoon | H02K 1/148 310/216.008 |
| 2012/0248928 A1* | 10/2012 | Hashimoto | H02K 1/148 310/216.009 |
| 2012/0272512 A1* | 11/2012 | Uchiumi | H02K 15/0081 29/596 |
| 2013/0026878 A1* | 1/2013 | Feuerrohr | A23L 2/52 310/216.136 |
| 2013/0076195 A1* | 3/2013 | Li | H02K 21/16 310/216.097 |
| 2013/0169097 A1* | 7/2013 | Saban | H02K 21/22 310/152 |
| 2013/0187514 A1* | 7/2013 | Iwata | H02K 15/024 310/216.009 |
| 2014/0009009 A1 | 1/2014 | Deguchi et al. | |
| 2014/0167557 A1* | 6/2014 | Kim | H02K 1/165 310/216.099 |
| 2014/0346918 A1* | 11/2014 | Uchitani | H02K 15/022 29/598 |
| 2014/0354108 A1* | 12/2014 | Nobata | H02K 15/14 310/216.135 |
| 2014/0361657 A1* | 12/2014 | Vohlgemuth | H02K 15/022 29/596 |
| 2014/0373532 A1* | 12/2014 | Diemer | H02K 5/203 60/607 |
| 2015/0042199 A1* | 2/2015 | Iwata | H02K 1/148 310/216.009 |
| 2015/0180298 A1* | 6/2015 | Horst | H02K 1/185 310/156.08 |
| 2015/0229177 A1* | 8/2015 | Langford | H02K 3/522 310/215 |
| 2015/0263572 A1* | 9/2015 | Hyppias | H02K 7/116 310/156.01 |
| 2015/0314849 A1* | 11/2015 | Jehangir | H02K 11/33 417/423.3 |
| 2015/0333577 A1* | 11/2015 | Jang | H02K 1/148 29/596 |
| 2015/0364954 A1* | 12/2015 | Senoo | H02K 1/14 310/216.009 |
| 2016/0043598 A1* | 2/2016 | Chang | H02K 1/14 310/254.1 |
| 2016/0099616 A1* | 4/2016 | Hino | H02K 1/16 310/216.043 |
| 2016/0164351 A1* | 6/2016 | Weiske | H02K 15/095 29/596 |
| 2016/0172921 A1* | 6/2016 | Yoshinori | H02K 3/28 310/215 |
| 2016/0365778 A1* | 12/2016 | Yu | H02K 3/345 |
| 2017/0093231 A1* | 3/2017 | Laing | H02K 21/12 |
| 2017/0149295 A1* | 5/2017 | Kawasaki | H02K 1/148 |
| 2017/0155291 A1* | 6/2017 | Deàk | H02K 1/182 |
| 2018/0212478 A1* | 7/2018 | Nakamura | H02K 15/022 |
| 2018/0229825 A1* | 8/2018 | Jehangir | H02K 3/44 |
| 2019/0013707 A1* | 1/2019 | Mihaila | H02K 1/182 |
| 2019/0393739 A1* | 12/2019 | Seo | H02K 1/148 |
| 2020/0094934 A1* | 3/2020 | Jehangir | B63H 5/15 |
| 2020/0119600 A1* | 4/2020 | Inuzuka | H02K 7/145 |
| 2020/0248616 A1* | 8/2020 | Rapp | F04D 25/0606 |
| 2021/0050752 A1* | 2/2021 | Hsu | H02K 1/148 |
| 2021/0050757 A1* | 2/2021 | Kitano | H02K 3/325 |
| 2022/0077726 A1* | 3/2022 | Le Berr | H02K 5/207 |

OTHER PUBLICATIONS

International Search Report and Written Opinion from PCT Application No. PCT/EP2020/060734, dated Jun. 15, 2020.

* cited by examiner

STATOR FOR AN AXIAL FLUX MACHINE

FIELD OF THE INVENTION

The present invention generally relates to the field of axial flux machines. More specifically, the present invention relates to a stator for an axial flux electrical machine and a method of producing the same.

BACKGROUND OF THE INVENTION

An axial flux machine is a type of electrical machine known in the art under a variety of different terms. In particular, but not exclusively limited thereto, it is nominated as a yokeless and segmented armature (YASA) motor or generator, a yokeless axial flux machine, an axial air-gap electronic motor or generator, an axial flux permanent magnet machine, or merely an axial flux machine. These terms may indicate a particular embodiment of such a machine, yet, in the continuation of this text, the term axial flux machine will be used. Nevertheless, it is appreciated that the basic principles of an axial flux machine remain applicable.

The basic principles are, broadly, that an axial flux machine comprises a disc- or ring-shaped rotor and stator structure coaxially arranged with a central axis. Typically, the stator comprises a plurality of stator elements, each comprising a coil and a ferromagnetic core rotational symmetrical arranged about said central axis and the rotor comprises a set of permanent magnets mounted on a bearing such that it may rotate about the central axis. Depending on the working condition, the rotor is either driven by fields originating from the stator, thus the machine is operating as a motor, or driven by an external force, such as a windmill, thus operating as a generator. An axial flux machine compared to other electrical machines has a higher power density. In other words, it is a lighter machine but having a similar power compared to other machines.

In DE10048492A1 an embodiment of such an axial flux machine is disclosed. Herein, the stator of said machine is formed by a plurality of stator elements mounted inside a rigid housing comprising radially inward cooling fins comprising a material having a high thermal conductivity.

The stator elements are arranged between said cooling fins after which a glue is applied to secure the stator elements between the cooling fins.

Another embodiment of an axial flux machine comprising radially inward cooling fins is disclosed in document WO2018015293A1 comprising a rigid stator housing comprising electrically isolated laminations or plates which are stacked. The plates comprise cooling fins arranged to fit between stator elements. In this stator, the stator elements are secured in the housing by casting a polymer resin in the housing.

A stator known in the art thus comprises a rigid housing comprising radially inward cooling fins wherein a plurality of stator elements is positioned. To assemble such a stator, each stator element is positioned into a cavity provided therefore between said cooling fins, and a glue or polymer resin is applied to secure the stator elements However, several drawbacks may be identified. Firstly, since a stator element comprising a coil needs to be positioned in a respective cavity, the coils need to be wound round a ferromagnetic core in such a way that the dimensions thereof are substantially smaller than the cavity to accommodate possible variations in the size and the shape of the coil. Therefore, there exists a gap between the coil and the cooling fins thereby increasing the thermal resistance between the coils and the cooling fins and thus limiting the cooling capacity of the stator. Secondly, when wound, a coil comprises a substantial amount of empty space resulting in a low copper fill factor. Consequently, this limits the efficiency and power of the stator. Thirdly, securing the stator elements by glue or by a polymer resin results in a stator with limited robustness and reliability since the mechanical strength and durability of a glue or a polymer resin is negatively influenced by the elevated temperatures which typically occur in the stator of high-power density motors. This limits the power and the reliability of the stator.

It is therefore an objective of the present invention to alleviate the above drawbacks and to provide a stator having an improved cooling capacity and a higher efficiency, power and reliability

SUMMARY OF THE INVENTION

This objective is achieved, according to a first aspect, by a stator for an axial flux machine, the stator comprising:
  a central axis which corresponds to the rotational axis of the axial flux machine when mounted; and
  an inner structure, an intermediate structure and an outer structure arranged coaxially around the central axis, the intermediate structure being arranged between the inner structure and the outer structure; and
  the inner structure comprising a plurality of rotational symmetrical arranged stator elements, a stator element comprising a ferromagnetic core and a coil wound around the ferromagnetic core; and
  the intermediate structure comprising a plurality of compression elements, a compression element comprising a circular segment and a protrusion radially extending therefrom; and wherein the outer structure is configured to press the compression elements with the protrusions radially inward the inner structure against the stator elements, the intermediate structure thereby compressing the coils and mechanically securing the stator elements.

Thus, the stator comprises three main parts, namely the inner, intermediate and outer structure. These parts are coaxially arranged around the rotational axis of the axial flux machine when mounted as the common central axis. More in particular, the inner structure is positioned the closest to the central axis, the outer structure the most distant from the central axis and the intermediate structure in between the inner and outer structure.

The inner structure comprises a plurality of stator elements which are coaxially and rotational symmetrically arranged around the central axis. The stator elements comprise each a ferromagnetic core and a coil wound around the ferromagnetic core.

Further, the intermediate structure comprises a plurality of compression elements. A compression element comprises a circular segment and a protrusion radially extending therefrom. The circular segment extends around the central axis and comprise a curved surface. Perpendicular to this surface, the protrusion extends radially towards the central axis when mounted. According to embodiments, a compression element comprises one of the group of a polymer, a metal, and/or a ceramic material.

The stator further comprises an outer structure which is configured to press the compression elements with their respective protrusions radially inward against the inner structure. By pressing the compression elements inward and against the inner structure, a first effect is that the coils are compressed in a direction around the central axis by the protrusions, thereby securing the stator elements in a tangential direction. A second effect is that the coils are compressed in a direction towards the central axis by the circular segments of the compression elements, thereby securing the stator elements in a radial direction. The outer structure is, for example, a belt or a ring-shaped structure configured to be placed or wrapped around the intermediate structure. The belt may, for example, comprise one closed unity, or may, for example, be wrapped around the compression elements. Furthermore, the belt may comprise a metallic or fibre-reinforced material suitable to absorb forces and may be pressed against the circular segments of the compression elements.

Different advantages may be identified. Firstly, by securing the stator elements simultaneously in radial and tangential directions an adequate robustness is provided. Further, compressing the coils results in a decrease of empty spaces in each coil leading to a higher copper fill factor of the stator. Further, the protrusion may serve as a cooling fin, for example when comprising a metal such as an aluminium alloy, a copper alloy or any other material suitable for transferring heat. Pressing the protrusions against the coils results in a good thermal contact. The heat dissipated in the intermediate structure of the stator may then efficiently be transferred towards to the outer structure. As a result, using the plurality of the compression elements instead of a rigid housing, the cooling capacity, the efficiency as well as the power increase compared to stators of a same size comprising a rigid housing. The robustness and the reliability increase as well compared to the stators comprising a rigid housing.

According to an embodiment, a compression element comprises a serrated surface configured to block a radial and/or axial movement of a stator element when secured.

The surface of the compression element may be serrated such that, when securing a stator element, a movement of the stator element regarding the compression elements is blocked. Differently formulated, the surface of the compression element is ribbed or serrated such that it grips to the surface of the stator element it secures. Because of this, a movement is blocked. This further increases the robustness of the stator providing more stability and safety when the axial flux machine comprising the stator is operating. Furthermore, the serrated surface allows to more easily mount the stator. When a compression element is inserted into the intermediate structure between two adjacent stator elements, the serrated surface will ensure that the compression element stays in place.

According to an embodiment, a compression element is configured to be secured by the outer structure through a tongue-and-groove connection.

The outer structure comprises at the surface facing the central axis a tongue or a groove, while a compression element at the intermediate structure comprises a corresponding groove or tongue, thereby forming the tongue-and-groove connections. Preferably, all compression elements are individually coupled with the outer structure through at least one tongue-and-groove connection. This way a large motor torque at the intermediate structure may safely and efficiently be transferred to the outer structure.

According to an embodiment, a compression element is further configured to be secured by the outer structure through a weld joint, a glued joint, or an adhesive bond.

Additionally, or alternatively, the compression elements may be further secured by the outer structure though one of the group of a weld joint, a glued joint, and/or an adhesive bond. Per compression element the surface pointing to the outer structure is welded or glued to the surface of the outer structure facing the compression elements.

According to an embodiment, a compression element further comprises a reinforcement.

The reinforcement strengthens the compression element in the direction of the protrusion, in the direction of the circular segment, or in both directions. The reinforcement is further configured to absorb a securing force when securing the stator elements. The reinforcement comprises a material of high strength suitable to absorb the securing forces. The reinforcement is, for example, a metallic, ceramic, and/or fibre material. An advantage of providing a reinforcement is that the compression element can be reinforced in dedicated zones, allowing materials with suitable properties to be used in different zones.

According to an embodiment, the intermediate structure further comprises a flexible member configured to couple adjacent compression elements.

The compression elements may further be connected to each other by a flexible member. The flexible member is, for example, a strip which couples adjacent compression elements. A plurality of flexible members may thus be used to couple different adjacent compression elements. Alternatively, the flexible member comprises a flexible ring which can be wrapped around the compression elements. An advantage of using one or more flexible members is that the compression elements are held in place thereby facilitating the mounting of the stator.

According to an embodiment, the flexible member couples the adjacent compression elements by their respective circular segments The circular segments and flexible members may be configured and shaped in such a way that adjacent compression elements may be coupled or connected to each other by their respective circular segments, for example by the borders thereof. This way the outer surface of the intermediate structure facing away from the central axis is a smooth or regular surface without variations in radius. Differently formulated, by connecting the circular segments with the flexible members, the outer surface of the intermediate structure forms a seamless annular wall of constant outer radius. The outer structure may then easily be mounted around this outer surface to secure the intermediate structure.

According to an embodiment, a flexible member is further configured to allow a relative movement between the adjacent compression elements when coupled.

Preferably, the flexible members are further configured to coupled adjacent compression elements and simultaneously to allow a relative movement between the compression elements they couple. This way mechanical stresses don't accumulate when the compression and/or stator elements expand because of the temperature cycling of the stator during operation.

According to a second aspect, the invention relates to an axial flux machine comprising a stator according to the first aspect of the invention.

According to a third aspect, the invention relates to a method for assembling a stator according to the first aspect, the method comprising the steps of:
 positioning the stator elements rotational symmetrical about the central axis such that an aperture between two adjacent stator elements is present; and
 inserting compression elements in the apertures through their respective protrusion; and
 securing the stator elements by mounting the outer structure

BRIEF DESCRIPTION OF THE DRAWINGS

Some example embodiments will now be described with reference to the accompanying drawings.

DETAILED DESCRIPTION OF EMBODIMENT(S)

According to an embodiment, the invention relates to a stator for an axial flux machine.

Figure 1:
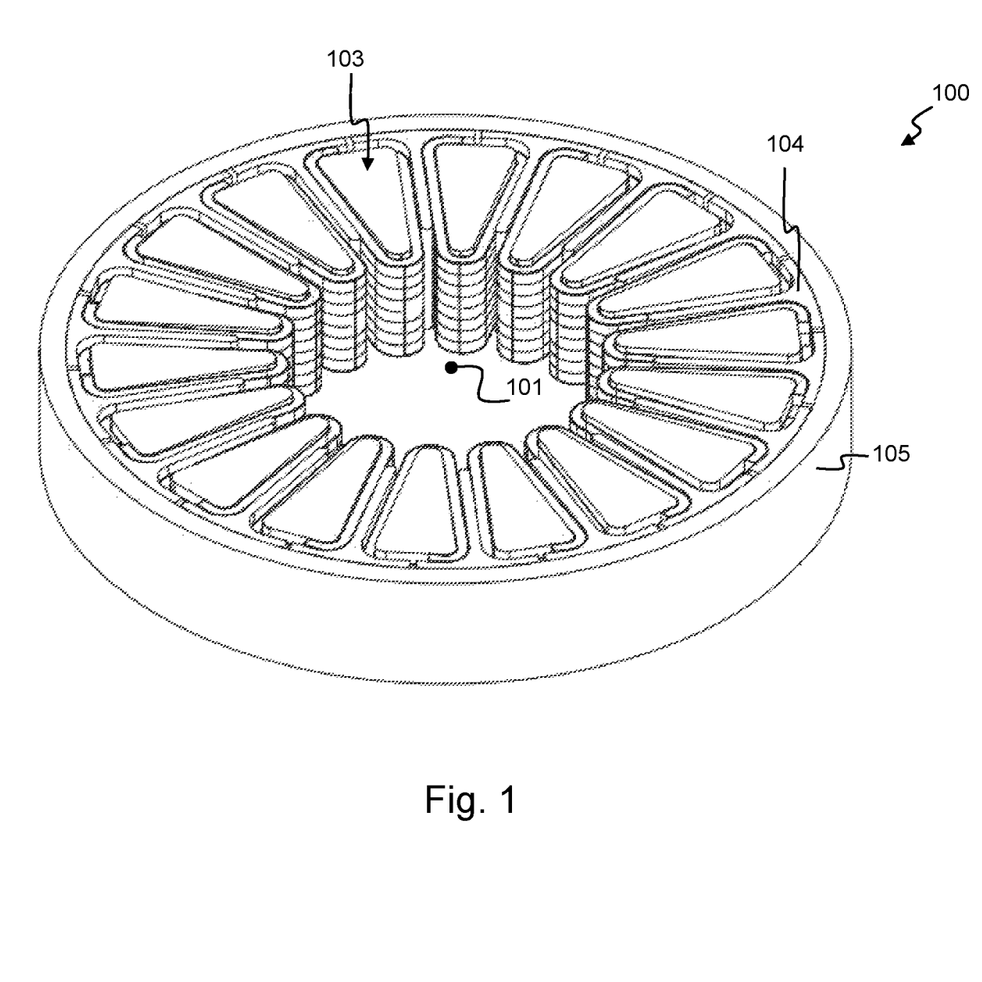
FIG. 1 illustrates a stator for an axial flux machine according to an embodiment of the invention.
Figure 2:
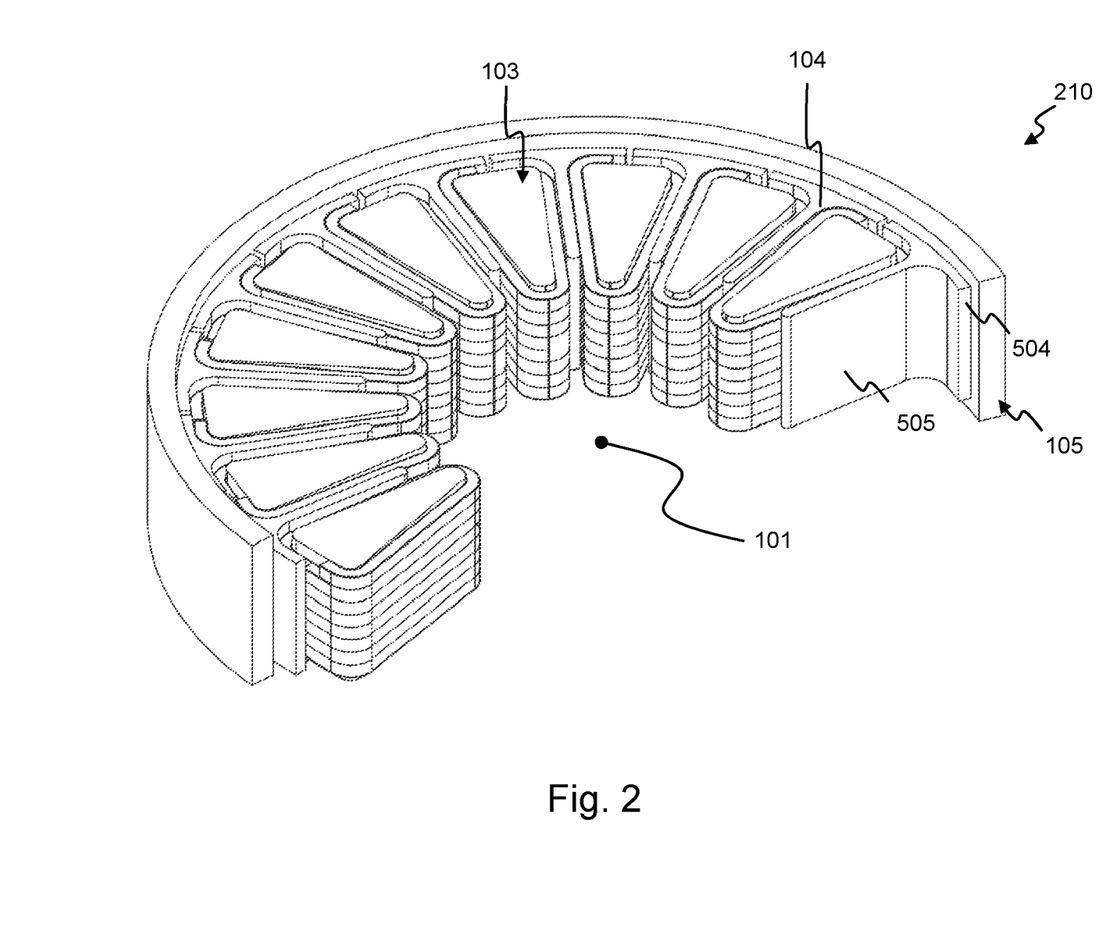
FIG. 2 illustrates a cross section of a stator according to an embodiment of the invention.

FIG. 1 illustrates such a stator. The stator 100 comprises an inner structure 103, an intermediate structure 104 and an outer structure 105. The structures 103-105 are arranged around a central axis 101. This central axis 101 corresponds to the rotational axis of the axial flux machine when mounted. Furthermore, the intermediate structure 104 is arranged between the inner structure 103 and the outer structure 105.

Figure 5A:
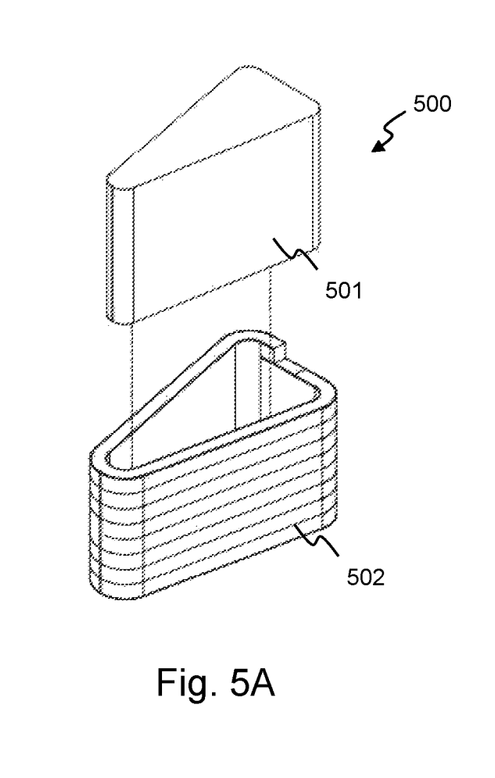
FIG. 5A illustrates a stator element comprising a ferromagnetic core and a coil and FIG. 5B illustrates a compression element according to an embodiment of the invention.
Figure 5B:
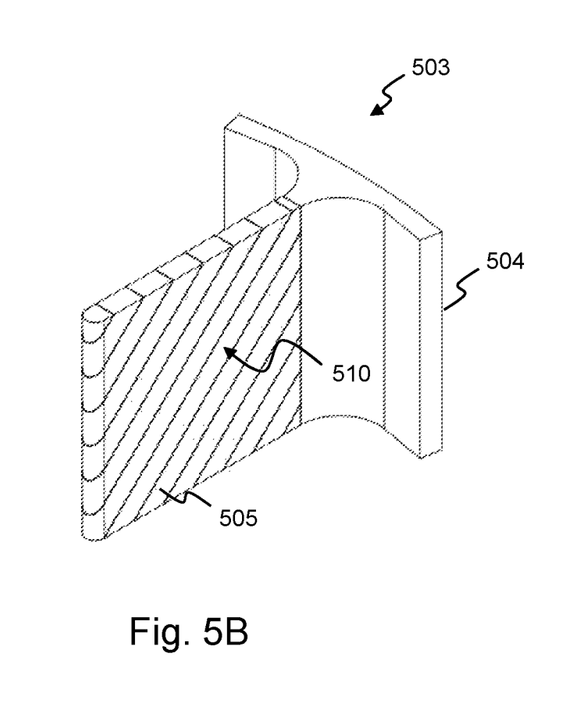

The inner structure 103 comprises a plurality of stator elements. FIG. 5A illustrates such a stator element 500 comprising a ferromagnetic core 501 and a coil 502 wound around the ferromagnetic core 501 when mounted. The intermediate structure 104 comprises a plurality of compression elements. FIG. 5B illustrates such a compression element 503 comprising a circular segment 504 and a protrusion 505 radially extending from the circular segment 504.

Figure 3:
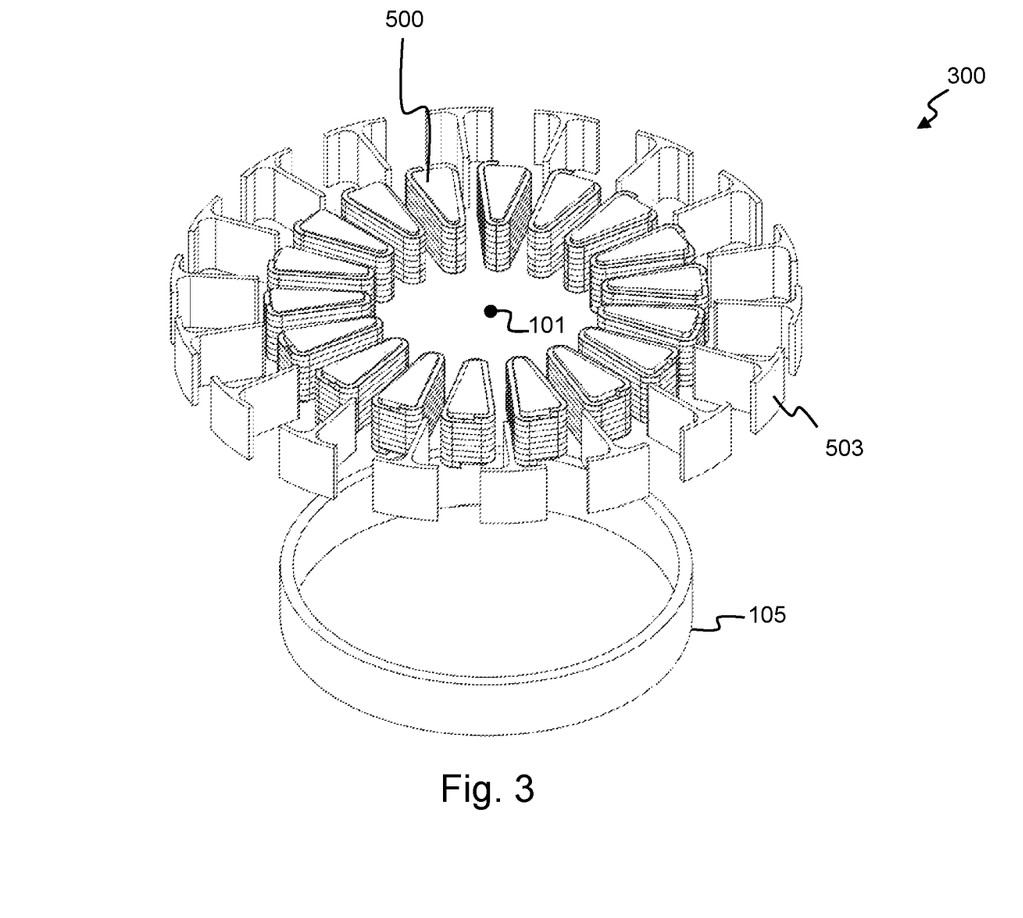
FIG. 3 illustrates an exploded view of the stator according to FIG. 1.

To assemble or mount the stator 100, the compression elements 503 are configured to be inserted with their respective protrusions 505 into the inner structure 103 for compressing the coils 502 such that the stator elements 500 are secured. In FIG. 3 an exploded view 300 of the stator 100 of FIG. 1 is illustrated for further illustrating the configuration of the stator 100. The stator elements 500 are rotational symmetrical arranged around the central axis 101. Likewise, the compression elements 503 are with their respective protrusions 505 arranged such that the protrusions point to the central axis 101 between two adjacent stator elements 500.

Figure 8A:
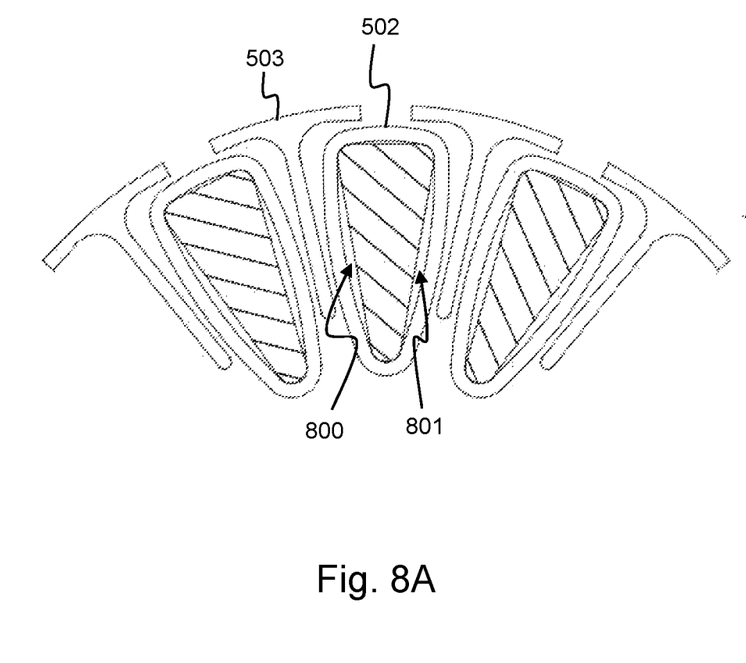
FIG. 8A and FIG. 8B illustrate compression elements compressing the coils of stator elements according to an embodiment of the invention.
Figure 8B:
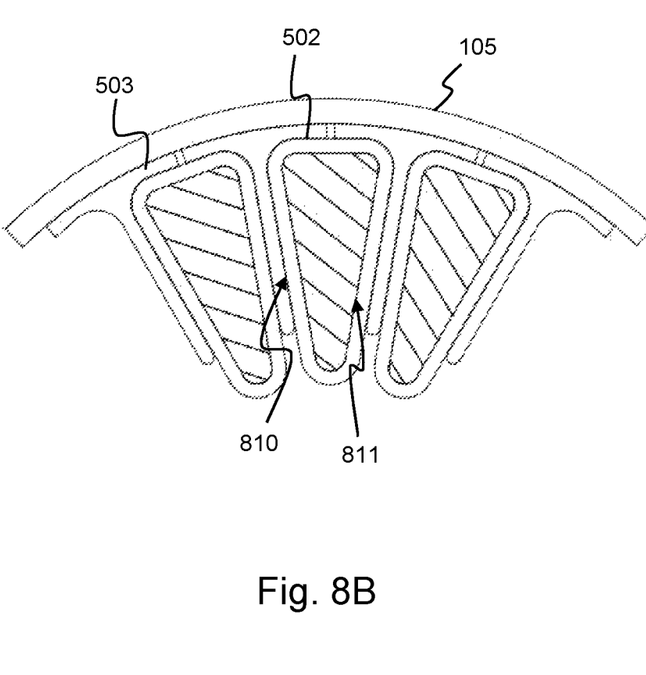

Next, as illustrated in FIG. 8A and 8B, the compression elements 503 are pressed against the stator elements 500. In FIG. 8A the situation or occurrence prior to the compression is illustrated. In this occurrence the coil 502 is wound around the ferromagnetic core 501 whereby still gaps are present illustrated by gaps 800 and 801. In FIG. 8B the occurrence is illustrated wherein the compression elements 503 with their protrusions 505 compress the stator elements 500 by pressing against the coils 502. This way the gaps are eliminated as illustrated by references 810 and 811, thereby increasing the copper fill factor and increasing the thermal contact between the coils 502 and the compression elements 503 and mechanically securing the stator elements 500. The compression elements 503 may further be secured by the outer structure 105.

Figure 4:
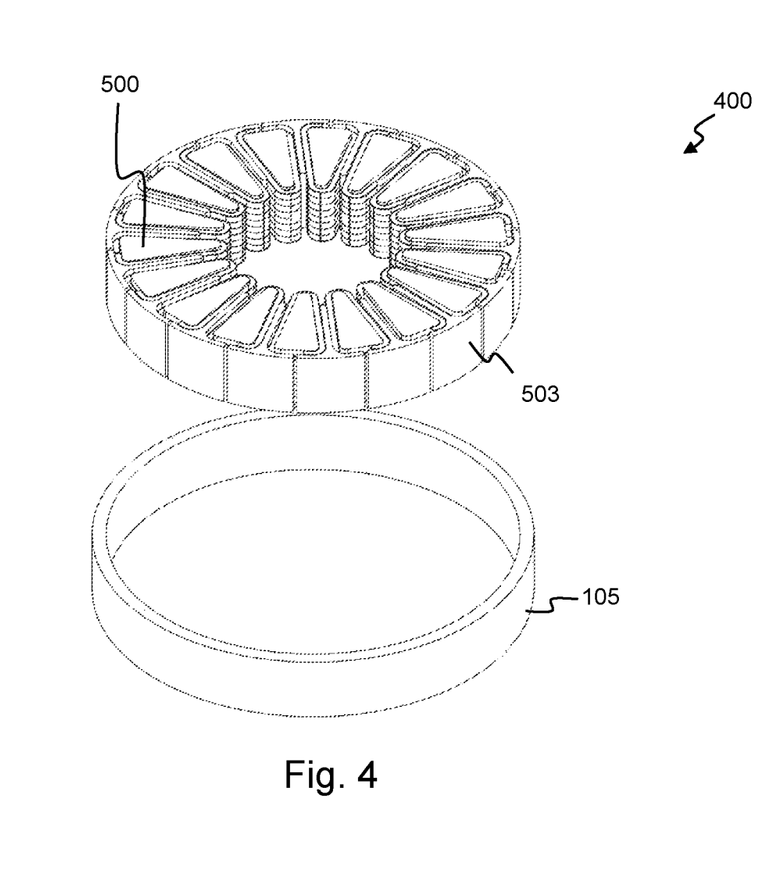
FIG. 4 illustrates a semi-exploded view of the stator according to FIG. 1 and FIG. 3.

The securing by the outer structure 105 may further be illustrated by FIG. 4 illustrating a semi-exploded view 400 of the stator. In this view 400, the compression elements 503 are pressed against the stator elements 500 thereby compressing the coils as illustrated in FIG. 8B and mechanically securing the stator elements 500. Next, the outer structure 105 may be mounted at the outer circumference of the compression elements 503, thus at the circular segments 504, to secure the stator 100. Since the compression elements 503 press radially inward against the stator elements 500, the stator elements are exerting forces in a direction tangentially around the central axis 101 against each other. Further, due to the pie-shaped form of the stator elements 500 and because they are exerting forces against each other through the protrusions 505 of the compression elements 503 in between, the stator 100 is securely mounted.

The outer structure 105 may further comprise a belt, which may be clasped around the compression elements 503. The belt may be constructed as one piece 105, as illustrated in FIG. 4 and placed over the compression elements 503 when assembled, such that the compression elements 503, and therefore also the stator elements 500 are secured.

Figure 6A:
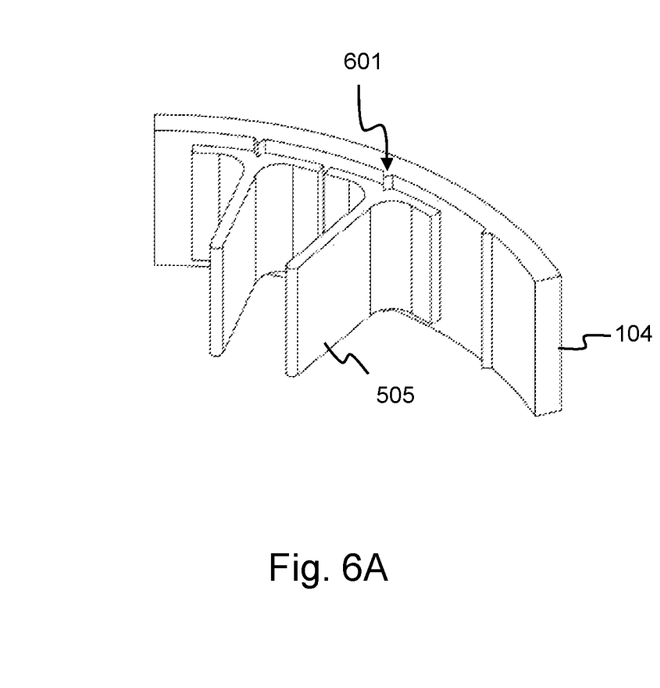
FIG. 6A and FIG. 6B illustrate a tongue-and-groove connection between an outer structure and a compression element according to an embodiment of the invention.
Figure 6B:
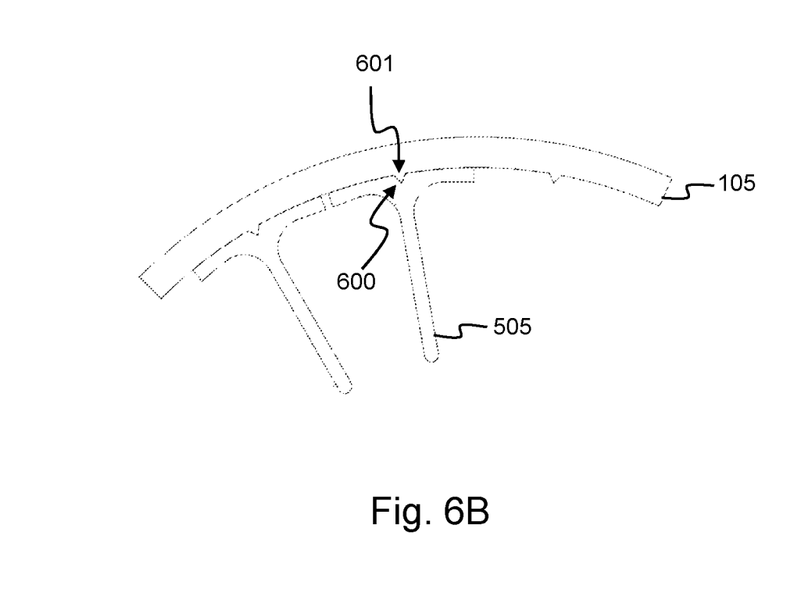

The compression elements 503 and the outer structure 105 may further be configured to be connected through one or more tongue-and-groove connections. This is illustrated in FIG. 6A and 6B. At a circular segment 504 of a compression element 503 a groove 600 may be present, while at the inner surface of the outer structure 105 a corresponding tongue 601 of the tongue-and-groove connection 600-601 is present. Through the tongue-and-groove connection 600, 601, the compression element 503 is coupled to the outer structure 105. This way, a torque originating from the inner structure 103 may securely be transferred to the outer structure 105. Alternatively, the coupling may occur through welding, gluing or otherwise affixing the circular segment 504 to the outer structure 105.

As illustrated in FIG. 6A and 6B a plurality of tongue-and-groove connections may be present to connect a plurality of compression elements 503 to the outer structure 105. Alternatively, only a limited number of the compression elements 503 comprise a groove 601, while at the outer structure 105 only at corresponding locations a tongue 601 is present.

The compression elements 503 may further comprise a serrated surface as illustrated by the hatched surface 510. Through the serrated surface, the compression elements 503 may grip onto an outer surface of a coil 502 when securing it, thereby blocking a radial and/or axial movement of a stator element 500 when mounted. In other words, the serrated surface aids in the securing of the stator elements.

The compression elements 503 may be fabricated from a polymer, reinforced by glass fibre or carbon fibre, and may further be reinforced by a metallic or a ceramic insert at the highest stressed area.

Figure 7:
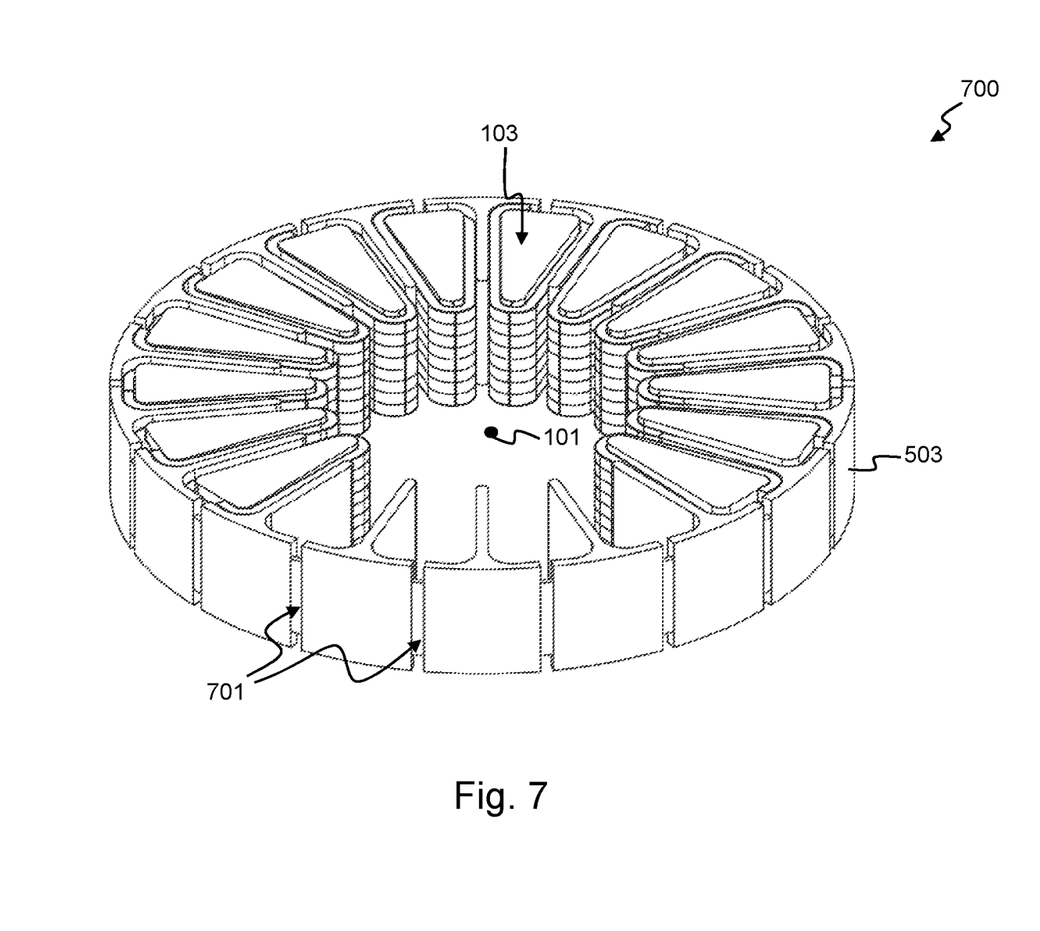
FIG. 7 illustrates another view of a stator according to an embodiment of the invention.
Figure 9:
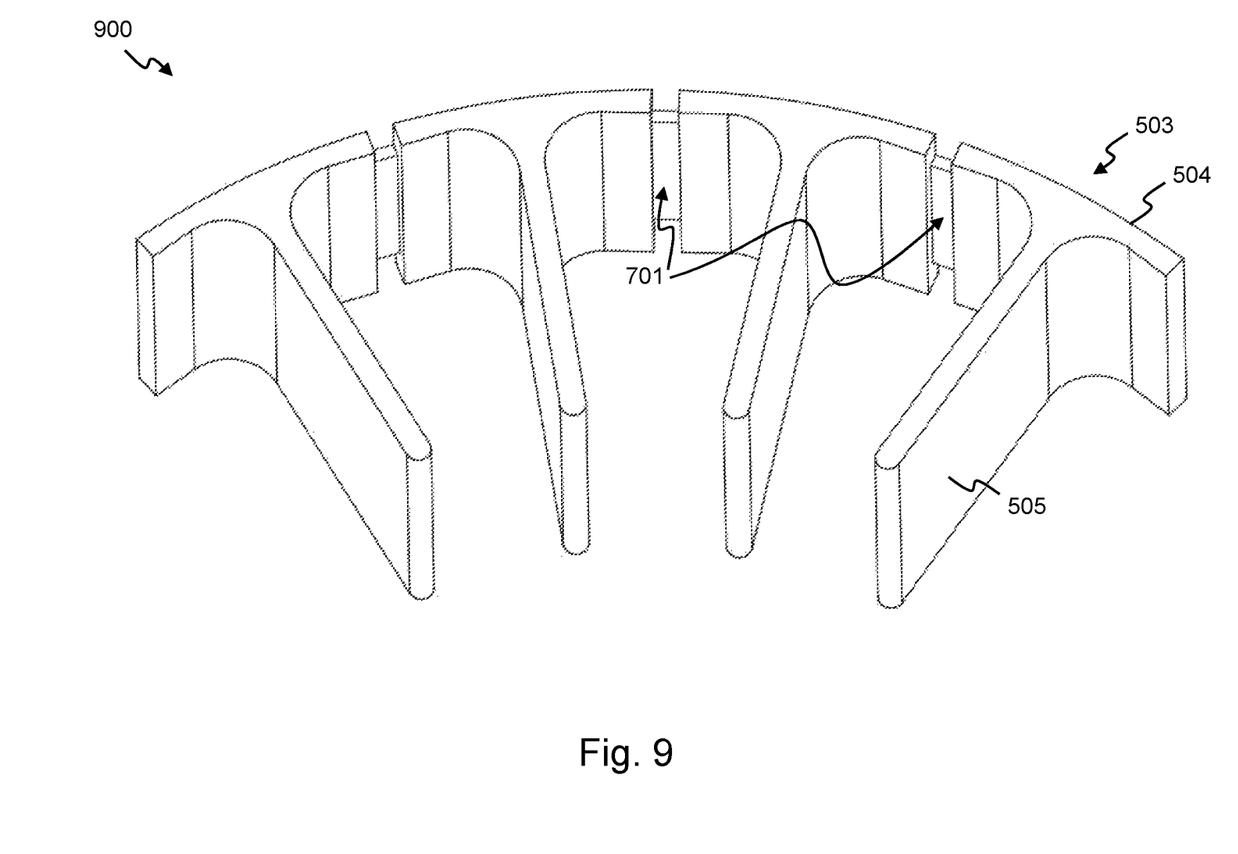
FIG. 9 illustrates a detailed view of flexible members coupling adjacent compression elements.

In FIG. 7 another exploded view of the stator is illustrated. In this view 700 flexible members 701 are illustrated connecting adjacent compression elements by their respective circular segments 503. The flexible members 701, on the one hand, couples the compression elements, and on the other hand allow a relative movement between them when, for example, expanding due to heat dissipation in the stator. Further, in FIG. 9 a detailed view 900 of compression elements 503 coupled by flexible members 701 is illustrated.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A stator for an axial flux machine, the stator comprising:
    a central axis which corresponds to the rotational axis of the axial flux machine when mounted; and
    an inner structure, an intermediate structure and an outer structure arranged coaxially around the central axis, the intermediate structure being arranged between the inner structure and the outer structure; and
    the inner structure comprising a plurality of rotational symmetrical arranged stator elements, a stator element comprising a ferromagnetic core and a coil wound around the ferromagnetic core; and
    the intermediate structure comprising a plurality of compression elements, a compression element comprising a circular segment and a protrusion radially extending therefrom; and
    wherein the outer structure is configured to press the compression elements with the protrusions radially inward the inner structure against the stator elements, the intermediate structure thereby compressing the coils and mechanically securing the stator elements.

2. The stator according to claim 1, wherein a compression element comprises a serrated surface configured to block a radial and/or axial movement of a stator element when secured.

3. The stator according to claim 1, wherein a compression element is configured to be secured by the outer structure through a tongue-and-groove connection.

4. The stator according to claim 1, wherein a compression element is further configured to be secured by the outer structure through a weld joint, a glued joint or an adhesive bond.

5. The stator according to claim 1, wherein a compression element comprises one of the groups of a polymer, a metal and/or a ceramic material.

6. The stator according to claim 1, wherein a compression element further comprises a reinforcement.

7. An axial flux machine comprising a stator according to claim 1.

8. A method for assembling a stator according to claim 1, the method comprising the steps of:
    positioning the stator elements rotational symmetrical about the central axis such that an aperture between two adjacent stator elements is present; and
    inserting compression elements in the apertures through their respective protrusion; and
    securing the stator elements by mounting the outer structure.

9. The stator according to claim 1, wherein the intermediate structure further comprises a flexible member configured to couple adjacent compression elements.

10. The stator according to claim 9, wherein a flexible member couples adjacent compression elements by their respective circular segments.

11. The stator according to claim 9, wherein a flexible member is further configured to allow a relative movement between adjacent compression elements when coupled.

* * * * *